Aug. 18, 1964  T. A. A. VÄLISALMI  3,144,847
REMOVABLE BULKHEAD FOR SHIPS' HOLDS
Filed Aug. 9, 1962  2 Sheets-Sheet 1

INVENTOR.
Tauno A Arve Antero Välisalmi
BY Michael S. Striker
Attorney

FIG. 4
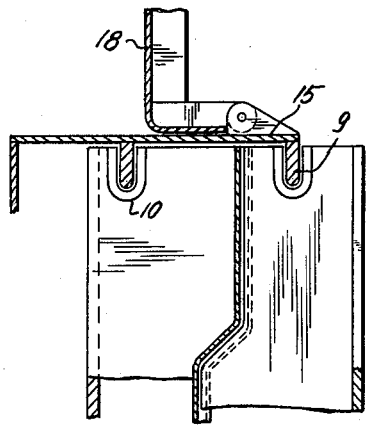
FIG. 5
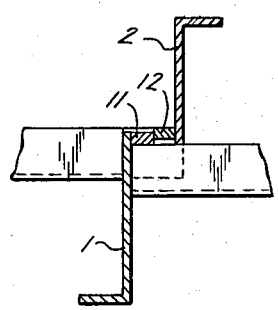
FIG. 6
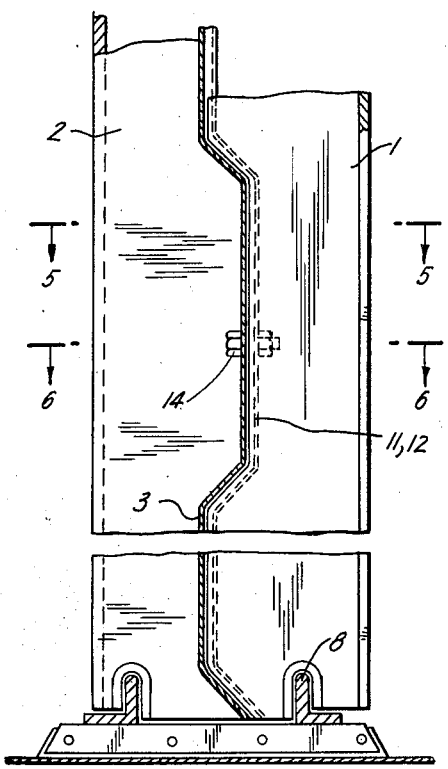
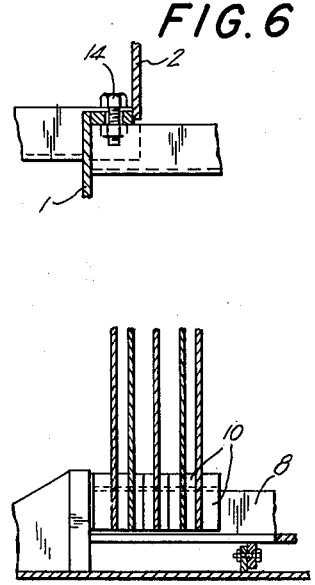
FIG. 7

United States Patent Office 3,144,847
Patented Aug. 18, 1964

---

3,144,847
REMOVABLE BULKHEAD FOR SHIPS' HOLDS
Tauno Aarre Antero Välisalmi, Turku, Finland, assignor to Valmet Oy, Helsinki, Finland
Filed Aug. 9, 1962, Ser. No. 215,927
10 Claims. (Cl. 114—75)

In ships' holds, temporarily erectable bulkheads are necessary for various purposes of which the most usual one is the transportation of bulk cargoes such as grain. International grain transportation rules require that a ship's hold loaded with loose grain must be provided with at least one bulk cargo retaining wall or shifting boards running in a fore and aft direction. The shifting boards may be permanent ones or constructed for collapsible erection. With a part bulk cargo the shifting boards are required to extend upwardly from the hold floor to a predetermined minimum level above the smoothed top surface of the cargo. With full bulk cargo the shifting boards are required to extend downwardly from the hold ceiling through a vertical distance to which a minimum is also set.

In general, normally erected dry cargo ships carry grain in their holds which must be capable of taking general cargo also. Because shifting boards encumber the handling of cargo the erection of a permanent one running in the fore and aft direction is out of the question in vessels of the stated kind. The conventional method is the following:

Along the center line of the ship's hold is provided a permanent bulkhead running in a fore and aft direction elsewhere excepting in the area cut off by the hatchway. In feeding grain to the ship's fold a provisional control is provided in the way of the hatchway and to meet the permanent center line bulkhead, the dimensions and strength of the said provisional control wall being defined by international rules. The shifting boards generally comprise a plurality of posts which are disposed along the fore and aft center line and are anchored by stay wires to the sides of the ship and adapted to support between them balks of timber. Often the cargo battens of the hold are used for the center line grain divisions as the same are superfluous on the sides of the hold when grain is being transported.

Some ships completely lack cargo battens of the hold, due to the special purpose of the ship. Sometimes, for some reason or another, it is not desired to use the said cargo battens for shifting boards. In such instances, for erecting shifting boards it is necessary to provide material specifically for the stated purpose. Because balks of timber appreciably diminish the cubic capacity of the hold the timber can be dispensed with by the use of panels strengthened, e.g., by corrugation and adapted to be stacked away in small space or nested snugly one within the other when not required for use. Panel members or sections strengthened otherwise than by corrugation have also been used for erecting shifting boards.

Cargo control panels hinged to depend from the hatchway coaming are recognized as a usable arrangement in the instance that the ship has a full bulk cargo and even with part bulk cargo, provided the hold is so low in depth that the panel suspended from the hatchway coaming and extending to the hold floor can be swung about its hinged edge and in between the hatch coaming and the side of the ship. The method, viz., involves swinging the cargo control panels out of use for stowage underneath the deck when cargo other than grain is being carried.

The drawbacks of the above described removable shifting boards may be stated as follows:

The erection and dismantling of shifting boards of timber and stayed-up posts is expensive because of the labour and materials involved. Replacement of timber with panel members does somewhat speed up the work but due to the basic structure of the shifting boards its erection and dismantling occupy considerable time and involve purely hand work.

Cargo control panels hingedly suspended from coamings have limited possibilities of use. If such panels are positioned special fillers must be provided in the hold ceiling between the cargo control panels and the sides of the ship, or then, other special arrangements must be made resulting in a ship of special design. Moreover, the ship's center of gravity will shift upwards when the cargo control wall is swung into raised position.

The instant invention has for its object to obviate the above stated drawbacks associated with prior art removable bulkhead constructions, i.e., to reduce the time spent in erecting and dismantling bulkheads, to render possible the use of machine power in the manipulation of cargo control walls, to reduce to a minimum the stowage space of a cargo control wall not required for use and to render possible the erection of the improved cargo control wall without any limitations as to type of ship and cargo.

In accordance with the present invention, a bulkhead for a ship's hold includes panel members mounted for movement substantially in the horizontal direction so the same can be moved into an assembly en bloc of overlapping panels and thence into extensions of each other to form the bulkhead of the ship, the two opposite edges of each panel member 4 advantageously being provided with major stiffeners 1 and 2 preferably parallel to each other and oppositely directed so that the panel members when packed will overlap one another, the said panel members preferably also having interlocking means whereby the several panel members forming the bulkhead can be pulled to form extensions of each other. The details of the invention will become apparent from the following description with reference to the accompanying drawing, wherein:

FIG. 4 is a cross section on the line B—B of FIG. 1, drawn to a larger scale;

FIG. 5 is a cross section on the line C—C of FIG. 4;

FIG. 6 is a cross section on the line E—E of FIG. 4 of the arrangement for interlocking the panel members;

FIG. 7 is a cross section on the line D—D of FIG. 3.

Figure 1:
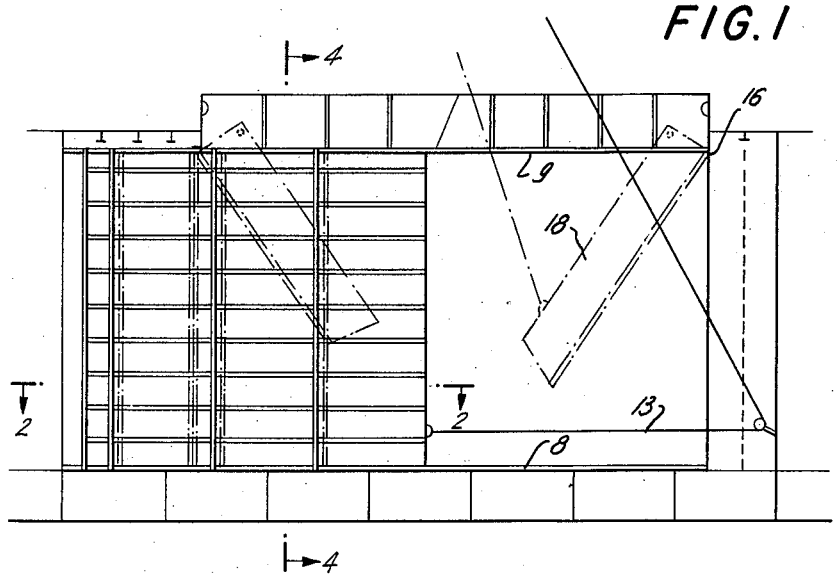
FIG. 1 is a front elevation of an amendment of a bulkhead of the invention as viewed from one side of the ship, and partly assembled.
Figure 2:
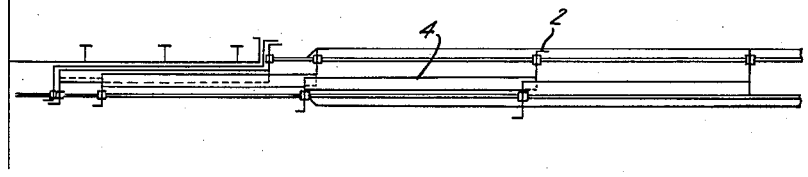
FIG. 2 is a cross section on the line A—A of FIG. 1, drawn to a larger scale.
Figure 3:
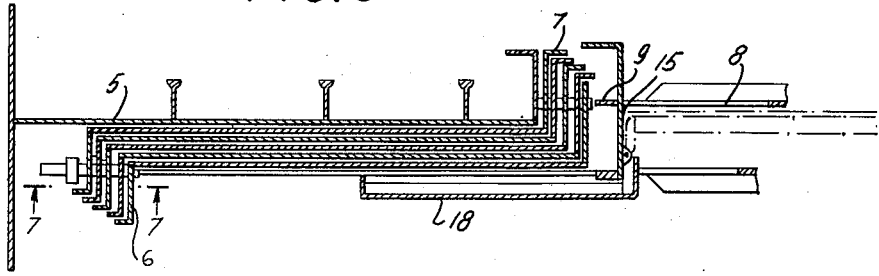
FIG. 3 is a cross section of bulkhead packed into small space.

The front of the removable bulkhead is formed by panel members each of which has major stiffeners 1 and 2 and a body 4 strengthened by ridges 3 parallel with the movement direction of the said members. The strengthening ridges of the bodies of the panel members are fashioned so that when the panel members are packed together the ridges of any panel member will nest within the ridges of neighboring panel members, the sum of the body material thicknesses of the various panel members at the contacting points amounting to the attainable minimum thickness of the stack of panel members at the point in question. The major stiffeners, which stiffen the panel member substantially at right angles to the ridge strengtheners of the body of the panel member, are located at the opposite edges of each panel member body and project therefrom in opposite directions. The major stiffeners of all panel members are parallel, when greatest possible saving its stowage space of panel members en bloc in their movement direction is required. In space saving instances the edge of the major stiffener secured to the panel member body is fashioned in the manner of the body ridges and does not project beyond the outermost point of the opposite face of the body. The shape of the major stiffeners is so selected that the matching major stiffeners of neighboring panel members will overlap one another when the members are packed together in the movement direction. Then, in principle, the minimum width of the members en bloc which can be attained in the movement direction will be equal to the width of one member plus the sum of thicknesses in the movement direction of contacting major stiffeners assembled en bloc.

Packed together the panel members are stowed against a permanent bulkhead 5 possibly provided in the hold. In the drawing the permanent center line wall at the hatchway end stands for the permanent bulkhead. For saving stowage space the packed panel members are positioned so that the major stiffener group 6 farthest away from the hatchway end points away from the bulkhead while the major stiffener group 7 at the hatchway end runs along the free end of the permanent bulkhead.

The motion of the panel members in the movement direction is guided in that two bottom guide rails 8 and two top guide rails 9 are provided in the embodiment shown by way of example in the drawing. The panel members have guide means 10 mounted on the top and bottom ends of each major stiffener so that each panel member is guided by two points at its bottom end and two points at its top end.

For facilitating the moving of the panel members into operative position the panel member edges respectively have interlocking means 11 and 12 mounted in close proximity to the major stiffeners and carried on that side of the member body which is opposite to the one with the major stiffeners. When the control wall is being moved into operating position, done conveniently by fixing a cable or rope to the panel member to be moved the farthest and then drawing on the rope or cable in the movement direction, the means 11 will interlock with the means 12 so the first panel member will draw the next one along etc. until all the members have been moved into their respective operative positions.

When the control wall is in its operative position the neighboring major stiffeners of two adjacent panel members will be located on opposite sides of the control wall. When necesssary, the panel members may be secured together by fasteners 14 in consequence of which the rigidity of the control wall will increase as far as the major stiffeners are concerned.

The bottom guide rails 8 are secured to the bottom by bolts so the same can readily be removed for mounting elsewhere when so desired.

The top guide rails 9 are connected by a web 15 and have a hinge-joint 16 at points near and adjacent to the periphery of the hatchway and break-up means within the hatch area. The guide rails may be let down to hang from their hinges fixed to the hatchway coaming and thus the same serve to protect the ends of the packed panel members.

For covering the hatchway area above the web 15 of the guide rails, bridges 18 hinged at 17 to the web 15 are provided and when the control wall is in inoperative position adapted to be turned so as to be of least hindrance in the hold, e.g., against the panel member packed into small space. In spreading out the control wall the bridge 18 is swung into position, secured at 19 and, when necessary, the bridge ends are bolted.

When necessary, the firmness of the control wall may be increased by attaching wall member with stay wires or tie ropes to the framework. If the guide means 10 on the major stiffeners and the guide rails 8 and 9 cannot be dimensioned so rigid as to overcome the pressure caused by the cargo, the major stiffeners are stayed to outer parts, if necessary, depending on the conditions to which the invention is applied.

It is to be understood that the invention is not limited to the hereinabove described embodiment but can be modified in many different ways within the scope and spirit of the invention. Thus, e.g., the control wall need not extend to the hold bottom if the compartment holding grain will be loaded full of cargo. Then, naturally, the bottom guide means of the control wall will be moved to the required level. For facilitating the sliding of members, the guide means may be made of, e.g., stainless material, may be provided with rollers or the like and so on. Fixed rails, ropes and the like may serve as guide means and this being the case the shape of the guide means must naturally be selected accordingly. The removable bulkhead of the invention may be constructed for movement in a direction other than the horizontal. In like manner there is nothing to prevent one from using panel members other than the vertical ones for its construction.

I claim:

1. For a ship's hold a removable bulkhead, characterized in including panel members mounted for movement substantially in the horizontal direction so the same can be moved into an assembly en bloc of overlapping panels and thence into extensions of each other to form a cargo control wall, the two opposite edges of each panel member advantageously being provided with parallel major stiffeners mounted to project in opposite directions from the opposite sides of said member so that the panel members when packed will overlap one another so the members proper are in as close proximity to each other as their dimensions permit, the said panel members preferably also having interlocking means whereby the several panel members forming the wall can be pulled out to form extensions of each other, and guide means comprising two bottom rails and two top rails adapted to slidably receive guide means on the members, the top guide rails being secured together by web means and fitted with hinges at a suitable structural point thereof and when necessary severed so that when the wall is in inoperative position the top guide rails and their supports are adapted to be suspended from said hinges.

2. A removable bulkhead comprising, in combination, guide means affixed to a structure housing said removable bulkhead; a plurality of panel members mounted on said guide means for movement in a substantially horizontal direction in a manner whereby said panel members are adapted to be positioned in an overlapping condition in relation to each other and are adapted to be extended in relation to each other to form a control bulkhead, each of said plurality of panel members having ridges for increasing the rigidity thereof formed therein extending in the direction of movement of said panel members and adjusted to overlap from panel member to panel member when said panel members are in overlapping condition, each of said plurality of panel members having opposite sides and opposite edges; and a pair of stiffeners affixed to the opposite edges of each of said plurality of panel members, each stiffener of each pair of stiffeners being substantially parallel to the other and extending substantially perpendicularly in opposite directions from the opposite sides of the corresponding panel member.

3. A removable bulkhead as claimed in claim 2, wherein each of said plurality of panel members includes interlocking means for joining said panel members in extended relationship to each other.

4. A removable bulkhead as claimed in claim 2, wherein each of said plurality of panel members and each of said stiffeners includes means for bolting to another panel member and to another stiffener.

5. A removable bulkhead as claimed in claim 2, wherein said guide means includes top guide means affixed to said structure above said removable bulkhead and bottom guide means substantially parallel to said top guide means and affixed to said structure below said removable bulkhead.

6. A removable bulkhead as claimed in claim 2, wherein said guide means comprises a pair of top guide rails affixed to said structure above said removable bulkhead and a pair of bottom guide rails affixed to said structure below said removable bulkhead, each of said panel members being movably mounted on said top and bottom guide rails.

7. A removable bulkhead as claimed in claim 2, wherein said guide means comprises a pair of top guide rails secured to each other by web means and hinge means hingedly affixing said top guide rails to said structure above said removable bulkhead and a pair of bottom guide rails affixed to said structure below said removable bulkhead, each of said panel members being movably mounted on said top and bottom rails, said top guide rails being adapted to be suspended from said structure by said hinge means.

8. A removable bulkhead as claimed in claim 2, wherein said guide means comprises a pair of top guide rails secured to each other by web means, hinge means hingedly affixing said top guide rails to said structure above said removable bulkhead and a pair of bottom guide rails affixed to said structure below said removable bulkhead, each of said panel members being movably mounted on said top and bottom guide rails, said top guide rails being adapted to be suspended from said structure by said hinge means, and further comprising bridge means hingedly affixed to the web means of said top guide rails in a manner whereby when said top guide rails are suspended from said structure said bridge means is pivotally movable into juxtaposition with a panel member.

9. A removable bulkhead for a ship's hold comprising, in combination, guide means affixed to the ship's hold; a plurality of panel members mounted on said guide means for movement in a substantially horizontal direction in a manner whereby said panel members are adapted to be positioned on an overlapping condition in relation to each other and are adapted to be extended in relation to each other to form a cargo control bulkhead, each of said plurality of panel members having ridges for increasing the rigidity thereof formed therein extending in the direction of movement of said panel members and adjusted to overlap from panel member to panel member when said panel members are in overlapping condition, each of said plurality of panel members having opposite sides and opposite edges; and a pair of stiffeners affixed to the opposite edges of each of said plurality of panel members, each stiffener of each pair of stiffeners being substantially parallel to the other and extending substantially perpendicularly in opposite directions from the opposite sides of the corresponding panel member.

10. Removable bulkhead as in claim 1, characterized in that that area above the panel members which the control wall must cover is adapted to be covered by a bridge means fitted with hinges to the guide rails web means so that when the web means which connects the guide rails is suspended from its hinges the said bridge means can be turned into a position where the same is of least possible intereference to the utility of the hold.

References Cited in the file of this patent

UNITED STATES PATENTS

| | | |
|---|---|---|
| 2,507,497 | Bowers | May 16, 1950 |
| 2,729,287 | Goldner | Jan. 3, 1956 |
| 2,750,914 | MacGregor | June 19, 1956 |
| 2,783,729 | Guthrie | Mar. 5, 1957 |
| 3,018,523 | Wilson | Jan. 30, 1962 |

FOREIGN PATENTS

| | | |
|---|---|---|
| 1,196,152 | France | May 25, 1959 |